Nov. 14, 1933.  W. A. MARRISON  1,935,325
FREQUENCY STANDARD
Filed April 2, 1929   2 Sheets-Sheet 1
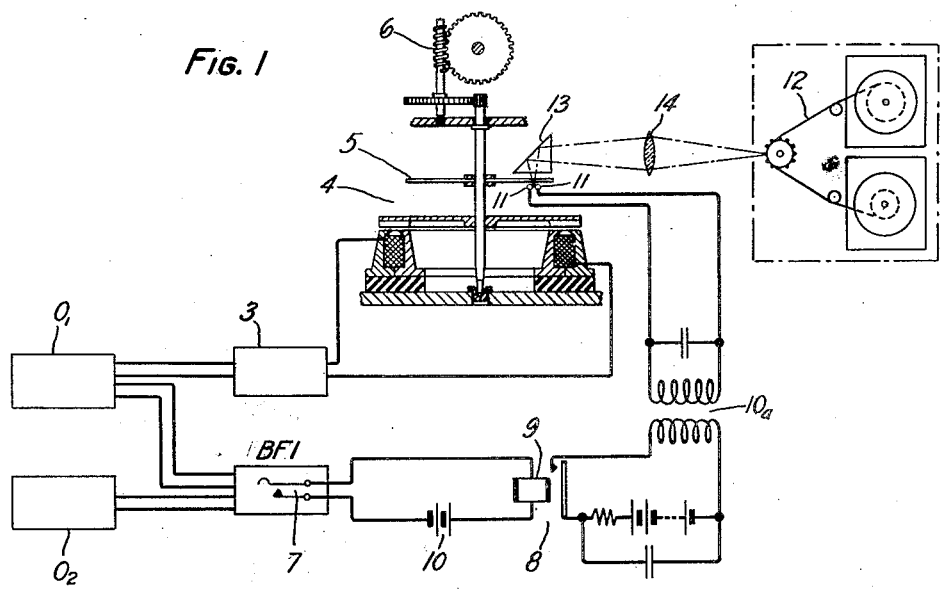
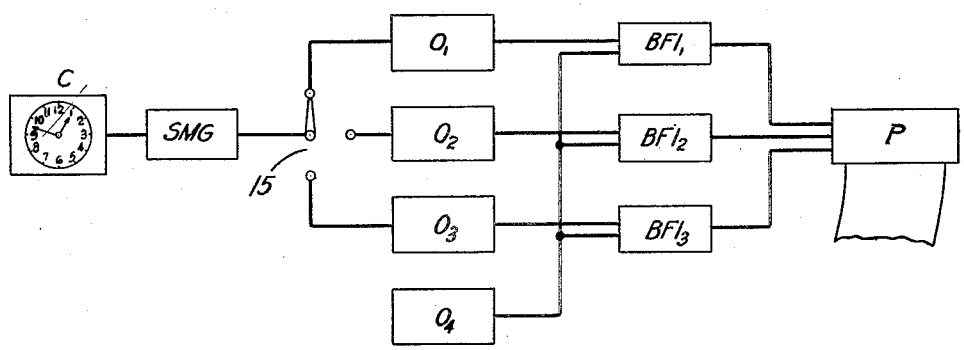
INVENTOR
W. A. MARRISON
BY
*Guy T. Morris*
ATTORNEY

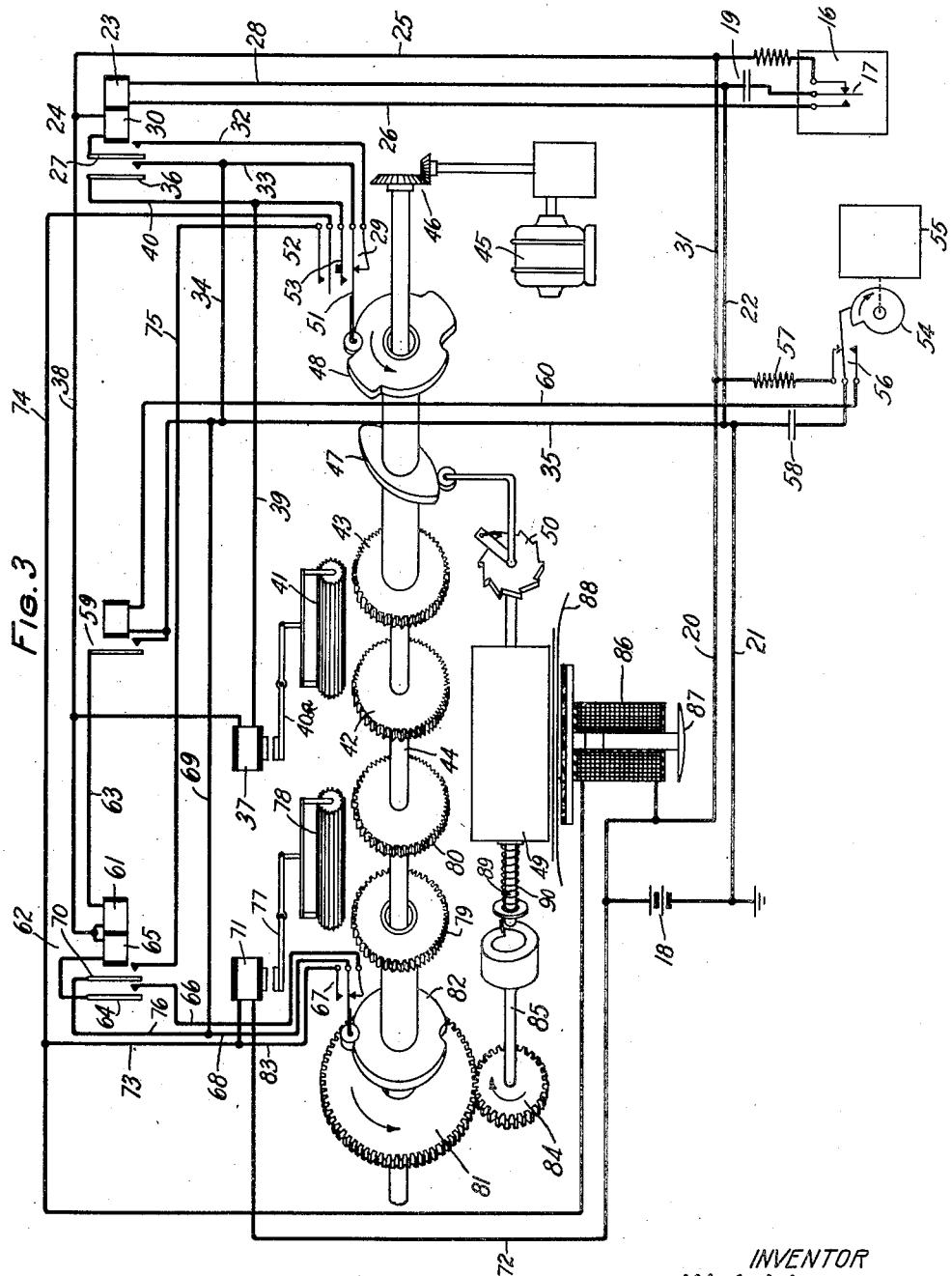

Patented Nov. 14, 1933

1,935,325

UNITED STATES PATENT OFFICE 1,935,325

FREQUENCY STANDARD

Warren A. Marrison, Maplewood, N. J., assignor to Bell Telephone Laboratories, Incorporated, New York, N. Y., a corporation of New York Application April 2, 1929. Serial No. 352,038

4 Claims. (Cl. 234—1.5)

This invention relates to frequency standards and particularly to methods and means for accurate comparison between frequencies derived from independent sources. Certain of the subject matter of this application, particularly that disclosed in Fig. 1 of the drawings, is being claimed in continuation application Serial No. 561,135, filed September 4, 1931.

It is an object of the invention to make a continuous and accurate comparison between the frequencies of the waves derived from a plurality of simultaneously and continuously operating wave sources and, further, to make a permanent record of such comparison.

The embodiment of a practical means for achieving the above object involves circuit relations and mechanism adaptable to recording systems of widely variant forms and usable in widely variant relationships, and which embody novel features of general application in electrical recording systems. Therefore a subsidiary object of the invention is, broadly, to effect recordation of a given electrical variation or sequence of electrical variations more efficiently and accurately than by prior methods or means and with greater simplicity of circuit and structural detail and with greater economy of plant.

In one specific form the invention may be used for automatically interchecking the frequencies of the waves from a plurality, three in the particular instance to be described in detail later, of primary frequency standards and to provide a permanent visible comparison record of the frequencies. In the comprehensive system in which the invention may be used a selected one of the three sources is used in the initial stage of a method for deriving frequencies covering the entire range used, for example, for communication purposes, and any one of the three sources, which are designed to have the same frequency, may be connected in the system. The method of the invention enables an operator to make a proper choice of primary oscillator based on prior comparative performance of each of them.

The method employs a fourth oscillator unit identical with the other three units except that the frequency is maintained at a slightly different value, the difference being, for example, about one cycle in ten seconds. The number of beats between the fourth oscillator and each of the other oscillators is recorded during a fixed period, say 1000 seconds, mechanism being employed for simultaneously counting the resultant beats and for recording them on a movable tape at the end of each such fixed period, the counting mechanism after each printing being automatically reset to zero. The resultant beat frequency record may be used, with a knowledge of the average frequencies of the waves from the three primary oscillators, to conveniently measure the comparative performance of such oscillators.

An alternative specific form of the invention is used to measure extremely small variations in relative frequency of any two of the waves from the three primary sources or from any other source whatever by the expedient of photographic reproduction of a scale reading which is made variable as in accordance with a variation of the beat frequency. In this method the wave from one of the comparison sources, stepped down in frequency if necessary, is used to drive a synchronous motor integrally connected to which is a rotatable scale. Electric sparks are caused to occur at a fixed point beneath the rotating scale at a frequency proportional to the beat between the above source and the second source and therefore proportional to the difference between the frequencies of the two waves concerned in the comparison. These sparks illumine a section of the scale which is photographed on a movable film. If the beat frequency is constant, with properly adjusted rotational speed of the scale, and with a proper stepdown of the first frequency, the same scale number will be photographed in each instance.

If the beat frequency varies from the above value that fact will be evidenced by a gradual progression of magnitude of the scale numbers so photographed. With proper choosing of elements this method can be used to measure frequency differences, or a variation of relative frequency, to an accuracy as great as one part in ten billion.

The above described features, as well as other features of the invention, more fully appearing hereafter, are realized in the arrangements set forth in the following description and illustrated in the accompanying drawings, in which:

Fig. 1 illustrates a specific form of the invention adapted for measuring extremely small variations in relative frequency; and Figs. 2 and 3 together illustrate a system for obtaining a continuous comparison record of the frequencies of the waves from a plurality of continuously functioning oscillators, Fig. 3 illustrating specifically the recorder shown at the extreme right of Fig. 2.

Referring to Fig. 1 the two wave sources, the beat frequency of which is to be measured by the method of the invention, are indicated by reference numerals $O_1$ and $O_2$. The wave from source $O_1$ is converted to a wave of a definitely lower frequency by device 3 which may, for example, be a subharmonic frequency producer whose fundamental is based on the frequency of source $O_1$. An example of such a subharmonic frequency producer is illustrated in U. S. patent to Schelleng 1,527,228, granted February 24, 1925. The use of this frequency stepdown means, in a practical case, is predicated on the use of other elements of the system whose frequencies have related given values and such means is not essential in the theoretical operation of the invention.

The wave from device 3 is used to drive a synchronous motor represented generally by reference numeral 4, the rotor of which has integrally attached to it a transparent scale 5. The motor may be adapted, in other environments, to perform other work than that required in the practice of this invention, as by the mechanical movement 6. The synchronous motor 4 is merely typical of a great many alternative types of synchronous motor that could equally well be used, the particular type illustrated being that otherwise illustrated and described in detail in a paper by J. W. Horton and the present applicant, in the Proceedings of the Institute of Radio Engineers for February, 1928, entitled "Precision determination of frequency" in which see particularly Fig. 10 and the context.

The device BFI is a beat frequency indicator. Its function is to produce from the waves derived from sources $O_1$ and $O_2$ a wave of their difference frequency and to actuate circuit closer 7 at the beat frequency. A device which is capable of performing those functions and which may therefore be used in the system of Fig. 1 is illustrated in Fig. 1, for example, of U. S. patent to Affel, 1,450,966, granted April 10, 1923.

The periodic closure of circuit closer 7 actuates relay 8 by means of electromagnet 9 and direct current source 10, at a corresponding frequency. The periodic operation of relay 8 results in an impulsive energization of the primary winding of transformer $10_a$ at a corresponding frequency and eventually in the production of a spark between electrodes 11 which complete a circuit across the transformer secondary.

Each spark discharge across electrodes 11 illumines a small portion of the transparent rotating scale 5, and under ideal conditions a single scale reading of the scale. The portion of the scale, or the scale reading, as so illumined is photographed on a slowly moving film 12 by means of light incident on the film by a path including the prism 13 or the like and a lens 14. If the periodicity of spark occurrence has an integral multiple relation to the periodicity of rotation of the scale, whether higher or lower, as should be provided for a given desired beat frequency, the same scale division will be repeated consecutively in the photograph record. A deviation from this condition indicates, and measures the extent of, a variation of the beat frequency from such value. For practical reasons, of course, the photographic device must comprise means for continuously feeding the film and for preventing exposure of the film except due to the spark illumination. Mechanisms capable of performing such functions are well known in the art and will not be described here. It is indicated schematically by the showing of the structure immediately associated with the film 12, the whole being included in dashed lines to represent a closure member.

The efficient operation of the invention so far described depends on the use of critical values of the electrical constants concerned in its function. In the particular apparatus that has been used by applicant and found effective, the scale 5 has one hundred divisions and is driven at 10 revolutions per second by a thousand-cycle synchronous motor driven from a subharmonic frequency producer, the source corresponding to source $O_1$ of the figure being adapted to generate a wave of 100,000 cycles frequency and the other source being adapted to generate a wave of 100,000.1 cycles frequency. With the values as given above, which are typical, the beat frequency between the oscillators $O_1$ and $O_2$, as measured by the accuracy with which the scale reading may be photographed, may be indicated to an accuracy of one part in ten thousand and the percentage error in the beat frequency, with the values as above, is one million times as great as the percentage error in the primary frequency from source $O_1$ or $O_2$. Accordingly, by the method described, the primary frequencies from sources $O_1$ and $O_2$ may be compared with a precision of one part in ten billion. By such a precise method arrangement much has been, and can be, learned about the nature of variations that occur in frequencies of wave sources. The method as practiced in the specific form illustrated and above described, is adaptable to the comparison of waves from high frequency sources about which especially there is much to be learned by the employment of the invention. However, the principle is applicable to comparison of any two frequencies without regard to their order of value or their order of difference.

It will be obvious that in special instances the invention may be practiced effectively without the use of frequency stepdown means 3 or of the combining means BFI. Of course, other means than that specifically described and illustrated for periodically illumining the scale may be used within the contemplation of the invention, the only necessary condition being a proper relation between the periodicity of the illumination and that of the beat frequency or of the frequency of the second source. This relation may be satisfied if the two periodicities are not the same so long as they are commensurable. Depending on the precise illuminating source and its physical relation to the scale, the scale may or may not be transparent.

Fig. 2 illustrates schematically a system in which a second species of the invention, to be described, may be used. The system has for its purpose the production of waves the frequencies of which differ from each other through a comprehensive range, all of the frequencies being based on a primary standard of great frequency stability. A choice may be made between the oscillators $O_1$, $O_2$ or $O_3$ as the primary standard of such a comprehensive system, the frequencies of said oscillators being as nearly alike as may be practically achieved. Since for practical reasons the maximum constancy of frequency is attainable in crystal control oscillators, oscillators $O_1$, $O_2$ and $O_3$ may be presumed to be of such type and therefore to generate oscillations of relatively high frequency. For this reason in the particular system contemplated the primary frequency is the highest in the series. Oscillators $O_1$ and $O_2$ may well be the oscillators similarly labeled in Fig. 1 which discloses an alternative comparison method or system. By means of the three-way switch 15 either one of these three oscillators may, at will, be used as the primary frequency standard of the system. The oscillations from the oscillator selected are impressed on submultiple frequency producer SMG which subdivides the frequency and therefore may be considered as a secondary source, depending on the primary source $O_1$, $O_2$ or $O_3$, for generating waves of a lower order of frequency. This submultiple frequency generator may be of the same type as has been described in connection with the similar element 3 of Fig. 1. A further subdivision of frequency may be accomplished by driving a synchronous motor with a selected submultiple frequency device SMG, which in turn mechanically drives one or more electrical generators adapted to generate frequency of lower order. The device C embodies such a synchronous motor shown here as driving a clock, the electrical generators, which may be operated from the same shaft, not being illustrated. A means is provided by the clock for indicating a variation in the frequencies of the system. A comprehensive frequency standard as above is the subject of the above identified paper by J. W. Horton and applicant in the Proceedings of the Institute of Radio Engineers for February, 1928.

It is the province of this species of the invention to obtain a continuous and prominent visible comparison record of the frequency from primary oscillators $O_1$, $O_2$ and $O_3$ rather than to indicate the variations of any one of them, which latter is accomplished by means of clock C. This comparison is made by means of tape recorder P, the details of which are shown in Fig. 3. The waves from the respective primary sources are combined with the wave from auxiliary source $O_4$, the movable element of a relay being actuated in accordance with the difference frequency. These frequency indicators may be identically the same as the device BFI of Fig. 1 and therefore may be similar to the modulator relay device MG illustrated in Figs. 1 and 3 of U. S. patent to Affel 1,450,966, granted April 10, 1923. In Fig. 2 the three leads connecting the beat frequency indicators with the recorder diagrammatically represent the three conductors entering the switching arrangement S of Affel from the device G.

In Fig. 3 which discloses the recorder circuits and mechanism in detail the switching arrangement 16, which may be structurally independent of the recorder proper and distant from it, corresponds to the switching arrangement G of the above Affel patent. The actuation of the movable element 17 of this switching arrangement or relay, occurs at the frequency of the wave emanating from any one of the beat frequency indicators. The figure illustrates the circuits and mechanism to record a single one of the beat frequencies and therefore constituting one of several duplicate elements in the recorder. The element 17 moves from a neutral position to contact on one side when the beat frequency current goes through zero in one direction and moves to the other contact when current passes through zero in the other direction. By means of the current derived from direct current source 18 controlled by relay or switching arrangement 16 the number of beats are counted on a counting mechanism to be described during successive equal intervals of say, 1000 seconds' duration, the total then being printed and the counter reset to zero.

When the movable contact 17 of the relay or switching arrangement 16 is actuated to the right by the beat frequency indicator $BFI_1$, $BFI_2$ or $BFI_3$ of Fig. 2 the circuit is closed from battery 18 to condenser 19 through circuit elements 20, 31, 21 and 22, whereby the condenser will be charged to the battery potential. When the movable element 17 moves to the other contact the condenser discharges through primary winding 23 of relay 24 by way of circuit elements 26 and 28. Relay 24 actuates back contact 27 to circuit closing position. Contact 27 closes a circuit through normally closed switch 29, secondary 30 of relay 24 and battery 18 through the following circuit elements traced in order from the upper terminal of battery 18: 20, 31, 25, 30, 27, 32, 29, 33, 34, 35 and 21. The secondary winding, through the above circuit, acts as a holding means to retain movable contact 27 in circuit closing position after the charge in condenser 19 has been completely dissipated in primary winding 23.

When the primary winding 23 is energized back contact 36 also will be actuated to circuit closing position and will be similarly retained in that position by the holding, that is, secondary winding. This contact 36 when so actuated completes a circuit through clutch magnet 37 which may be traced as follows from the upper terminal of the battery 18: 20, 31, 25, 38, 37, 39, 40, 36, 34, 35 and 21.

Clutch relay 37 actuates pivoted armature $40_a$ to engage gear 41 with gears 42 and 43. Gear 42 is rigidly attached to a shaft 44 which is driven by motor 45 through intermeshed gears 46. Gear 43 and cams 47 and 48 are integrally connected together and to a sleeve loosely mounted on the shaft 44, so that the clutching operation effectively connects gear 43 and cams 47 and 48 to the continuously rotating shaft 44.

The movement of cam 47 through half of a complete rotation actuates a counting mechanism represented generally by box 49 through ratchet mechanism 50. At the beginning of the rotation of cam 47, the cam 48 actuates movable contact 51 of switching arrangement 52 to close a circuit through fixed contact 53 while maintaining closed the circuit closer 29, of which the movable contact 51 also constitutes an element. By this means a circuit is first closed in shunt to the circuit closer of which contact 36 of relay 24 is an element and therefore closes the maintaining circuit through the clutch magnet 37. By a further movement of contact 51, although before it attains its highest position, contact is broken at circuit closer 29 which therefore opens the circuit through the secondary holding winding of relay 24 which, with the maintaining circuit established through clutch 37, is no longer of utility.

By the means so far described the cycles of the beat frequency between oscillator $O_1$, $O_2$ or $O_3$ and auxiliary oscillator $O_4$, are counted as they occur. By the circuits and mechanism now to be described, the total at the end of a definite time interval, such as 1000 seconds, may be printed and the counting mechanism reset.

Cam 54 is rotated by driving means 55 at a very constant speed so as to make one complete revolution in the time interval during which the beat frequencies are to be counted by the mechanism 49. This driving means may conveniently be the synchronous motor operating clock C disclosed in Fig. 2. It might be questioned whether one of the primary sources to be checked should be used to determine this time interval, as would result from the use of this synchronous motor to drive the cam 54. However, no serious error arises from this since, in the instance cited, the variation in the interval due to a change in frequency of the primary source is only one millionth of the variation in the number recorded by the counting mechanism. The specific conditions in the instance cited are that the primary source oscillates at about 100,000 cycles; the synchronous motor is driven by a 1000-cycle wave, and 1000-second intervals are used and the frequency differences are such that there is about one beat in ten seconds.

When cam 54 is in the position illustrated a circuit is closed through switching arrangement 56 which may be traced from the upper terminal of battery 18, through conductor 20, resistance 57, upper contact of switching arrangement 56, the movable contact, condenser 58 and conductor 21 back to the battery. This insures that during the time required for a complete rotation of the cam 54, the condenser 58 will be charged substantially to the potential of battery 18. At the end of the 1000-second interval the removable contact will drop to the lower contact of the switching arrangement and a condenser will discharge through the magnet of relay 59, the discharging circuit including conductors 35 and 60. When the magnet of relay 59 is energized the relay contacts will be closed completing a circuit through the primary windings 61 of relay 62, the circuit being traceable from the upper terminus of battery 18, through conductors 20, 31, 25 and 38, winding 61, conductor 63, the contacts of relay 59 and conductors 35 and 21, back to the battery. Energization of this relay winding actuates both of the moving contacts of the relay to close two circuits. Actuation of movable contact 64 closes a circuit through the secondary winding 65 of the relay magnet. This circuit may be traced as follows from the upper terminus of battery 18: conductors 20, 31, 25 and 38, the secondary winding 65, contact 64, conductor 66, the middle and lower contacts of switching arrangement 67 which are normally closed and conductors 68, 69, 35 and 21, back to the other terminus of the battery. The secondary winding acts as a holding means so that further energization of the primary winding 61 may be dispensed with.

Movable contact 70 of the relay 62 closes a circuit through clutch magnet 71. The complete circuit may be traced as follows from the upper terminus of battery 18: conductor 72, winding of clutch magnet 71, conductors 73 and 74, the upper two contacts of switching arrangement 52 which are closed by the last part of a half revolution of the counting cam 48, conductor 75, relay contact 70, and conductors 76, 69, 35 and 21, back to the battery.

The clutch magnet 71 actuates pivoted armature lever 77 so as to engage gear 78 with gears 79 and 80. Similarly as in the instance of the counting mechanism this clutching action effectively clutches gears 79 and 81 and cam 82 to the shaft 44 and therefore initiates the resetting operations. The initial movement of cam 82 closes a maintaining circuit through the upper two conductors of switching arrangement 67 and the clutching magnet 71, the circuit being traced as follows from the upper terminus of battery 18: conductor 72, winding of clutching magnet 71, conductor 83, the upper two contacts of switching arrangement 67, and conductors 68, 69, 35 and 21, back to the battery. This circuit relieves the secondary winding of relay 62 from its duty with respect to the reset clutch. It is necessary that the operation of the clutch magnet 71 be related to the operation of the counting cam through cam 48 and upper two contacts of switch arrangement 52 as above explained in order to insure that the totals are not printed and the counting mechanism reset while a number on the counting mechanism is being changed, that is, during a counting step.

Rotation of the gear 81, now clutched to the shaft 44, rotates gear 84 engaged therewith, and therefore shaft 85 connected therewith to move the resetting stem 89 of the counting mechanism to the right from which position it is restored after a rotation of the shaft 85, by spring 90. In order to insure that shaft 85 makes one complete rotation during the half rotation of cam 82 a two-to-one ratio between gears 81 and 84 is required. The rotation of the shaft of one complete revolution in this direction, resets the counter to zero.

Coincidentally with the energization of the reset clutch magnet, or slightly before, in order to insure a completion of the operation before resetting, printing magnet 86 is energized through a circuit connected directly in shunt to the clutch magnet 71. This magnet actuates armature 87 to push a tape 88 against the numbers of the counter to register the totals at the end of the thousand-cycle interval.

The details of the counting and printing mechanism are not disclosed as being well known in the art. An example of a counter such as may be used in the circuit of the invention and above described, is disclosed in a slightly different relationship in U. S. patent to Richard 1,269,309, granted June 11, 1918.

By the arrangement of Fig. 3, as above described, a printed record may be obtained of the number of cycles of the wave resulting from a combination of the wave from either of the oscillators $O_1$, $O_2$ and $O_3$ with a wave from auxiliary oscillator $O_4$. It should be understood that a similar record is simultaneously made of the beat frequency cycles resulting from the combinations of the waves involving the other two primary oscillators and that these records are all printed on a single moving tape. By the resultant record a simple means is provided for comparing the three primary frequencies. This comparison may be facilitated by knowledge of the average of the three primary oscillation frequencies. This average may be obtained in a variety of ways as for instance by the use of means similar to that involving the clocks C in the specific system shown. Designating the frequencies of the four oscillators by $f_1$, $f_2$, $f_3$ and $f_4$, and assuming a 1000-cycle interval, the three numbers recorded by the recorder of Fig. 3 are $$1000\ (f_4-f_1),\ 1000\ (f_4-f_2),\text{ and }1000\ (f_4-f_3).$$

The mean of these numbers is $$1000 \left(f_4 - \frac{f_1+f_2+f_3}{3}\right).$$

If we subtract each of the original three recorded numbers from the mean we obtain $$1000 \left(f_1 - \frac{f_1+f_2+f_3}{3}\right)$$

$$1000 \left(f_2 - \frac{f_1+f_2+f_3}{3}\right)$$

$$1000 \left(f_3 - \frac{f_1+f_2+f_3}{3}\right).$$

Thus the performance of each of the four oscillators may be readily computed in terms of the mean of the three similar primary oscillators. It is obvious that the accuracy of intercomparison of the three similar oscillators does not in any way depend upon the constancy of oscillator $O_4$. For practical convenience, however, its frequency should be controlled substantially as carefully as the others.

What is claimed is:

1. In a method of comparative frequency measurement, the steps of combining two frequencies to be compared recording each consecutive cycle of the beat frequency in a given time interval and repeating such recordation during each like consecutive time interval.

2. In a frequency comparison system, a plurality of wave sources whose frequencies are to be compared, a wave combining means, and means for making a permanent record of the comparative frequencies of said waves by recording the cycles of the difference frequencies resulting from the combination of the wave from said combining means with the waves from said sources as they occur.

3. In combination, a plurality of wave sources, an auxiliary wave source, and means for simultaneously and continuously making a single permanent visible record of the difference frequencies between the waves from all said first-mentioned sources taken one at a time, and the wave from said auxiliary wave source.

4. An electrical recording system comprising a source of waves whose cycles are to be recorded, a counting and printing mechanism, means actuated by said waves for counting the cycles of the wave, and a time controlled means comprising means for transmitting electrical impulses at constant time intervals, and means actuated by said impulses for printing the record set up by said counting mechanism and for resetting said mechanism during each said interval to zero.

WARREN A. MARRISON.